United States Patent
Wang

(10) Patent No.: US 7,511,613 B2
(45) Date of Patent: Mar. 31, 2009

(54) LIGHTING CONTROL WITH OCCUPANCY DETECTION

(75) Inventor: Ling Wang, Chicago, IL (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 331 days.

(21) Appl. No.: 10/597,078

(22) PCT Filed: Jan. 11, 2005

(86) PCT No.: PCT/IB2005/050126

§ 371 (c)(1),
(2), (4) Date: Jul. 11, 2006

(87) PCT Pub. No.: WO2005/069698

PCT Pub. Date: Jul. 28, 2005

(65) Prior Publication Data

US 2007/0146126 A1    Jun. 28, 2007

Related U.S. Application Data

(60) Provisional application No. 60/535,833, filed on Jan. 12, 2004.

(51) Int. Cl.
*G08B 1/08* (2006.01)
(52) U.S. Cl. .......................... 340/539.26; 340/539.22; 340/539.23; 340/539.1; 340/540
(58) Field of Classification Search ............. 340/567, 340/572.1, 539.1, 286.01, 539.26, 539.22, 340/539.23, 540, 555, 641; 315/291, 297, 315/307–326, 149–159, 224, 225
See application file for complete search history.

(56) References Cited

U.S. PATENT DOCUMENTS

| | | | | |
|---|---|---|---|---|
| 5,598,042 A | * | 1/1997 | Mix et al. ................ | 307/116 |
| 5,838,116 A | * | 11/1998 | Katyl et al. .............. | 315/307 |
| 6,263,260 B1 | | 7/2001 | Bodmer et al. | |
| 6,340,864 B1 | * | 1/2002 | Wacyk ..................... | 315/158 |
| 6,404,079 B1 | | 6/2002 | Hsieh | |
| 6,823,195 B1 | * | 11/2004 | Boesen .................... | 455/522 |
| 2002/0175815 A1 | | 11/2002 | Baldwin | |
| 2005/0179404 A1 | * | 8/2005 | Veskovic et al. ......... | 315/291 |
| 2008/0185969 A1 | * | 8/2008 | Vegter et al. ............. | 315/158 |

FOREIGN PATENT DOCUMENTS

| | | |
|---|---|---|
| DE | 19625197 A1 | 1/1998 |
| JP | 2001-68274 A | 3/2001 |

* cited by examiner

*Primary Examiner*—Tuyet Vo

(57) ABSTRACT

In illuminated local areas occupants are actively detected to facilitate control of the illumination and possibly other local parameters such as temperature. The emitted light in each local area is uniquely modulated to identify the respective area. The modulated light is detected by any wearable occupancy detectors in the local areas, which transmit detector-locator signals to lighting control units, thereby identifying which local areas are occupied. These signals may also uniquely identify the respective detectors, thereby enabling a lighting system controller to determine the number and identities of the detectors in each local area.

18 Claims, 5 Drawing Sheets

LIGHTING CONTROL WITH OCCUPANCY DETECTION

CROSS REFERENCE TO RELATED APPLICATION

This application claims the benefit of U.S. provisional application Ser. No. 60/535,833, filed Jan. 12, 2004, which the entire subject matter is incorporated herein by reference.

This invention relates to lighting control and, in particular, to lighting control including occupancy detection.

As is well known, fluorescent lamps offer large energy savings in comparison to incandescent lamps. As the cost and energy efficiency of light-emitting-diode (LED) light sources improve, they are becoming viable alternatives for fluorescent lamps, further offering the advantage of color control. Whatever the lighting source, however, energy savings can be further improved by dimming or extinguishing illumination in unoccupied areas. This requires some type of occupancy detection.

As is noted in U.S. Pat. No. 6,340,864, which is hereby incorporated by reference, one type of occupancy detector senses movement of an occupant in a lighted area. This type of arrangement can fail to detect an occupant sitting still or in a part of the lighted area not visible to the sensor, resulting in the lighting being extinguished erroneously. False detection is also possible if motion of something other than an occupant is detected.

There is a need for lighting control which is based on accurate occupancy detection, which is not overly complicated, and which readily interfaces with lighting control systems.

In accordance with the invention, a light source illuminates a local area with light that is modulated to identify the local area. In response to detection of the modulated light, a wearable occupancy detector located in the local area radiates a signal identifying the local area. The radiated signal is received by a control unit that is in communication with the light source and is capable of controlling a lighting function of the light source.

Note that, as used in this patent application, the words "local area" and "wearable" have defined meanings. The words "local area" mean any area illuminated with a respective light modulation identifier. For example, a local area could be a single room, a plurality of rooms in the same or different parts of a building, one or more outside spaces, etc. The word "wearable" refers to the ability to be easily worn, carried or otherwise transported by a person.

Occupancy detection in accordance with the invention does not depend on motion and avoids the problems described in the Background of the Invention. It is also relatively simple and readily interfaces with lighting control systems. In a particularly advantageous form of the invention, the signal radiated by the wearable occupancy detector identifies both the local area in which it is located and the specific detector making the transmission. Thus, using the example of a number of local areas and wearable occupancy detectors, each having a unique identifier, the numbers of occupants in each local area can be determined. This information can be utilized to improve safety, e.g. detecting in which areas one or more occupants are located in the event of a fire. As a further advantage, if each wearable occupancy detector identifies a particular person, security can be improved by utilizing this information to detect the presence of unauthorized persons in limited-access areas.

Figure 1:
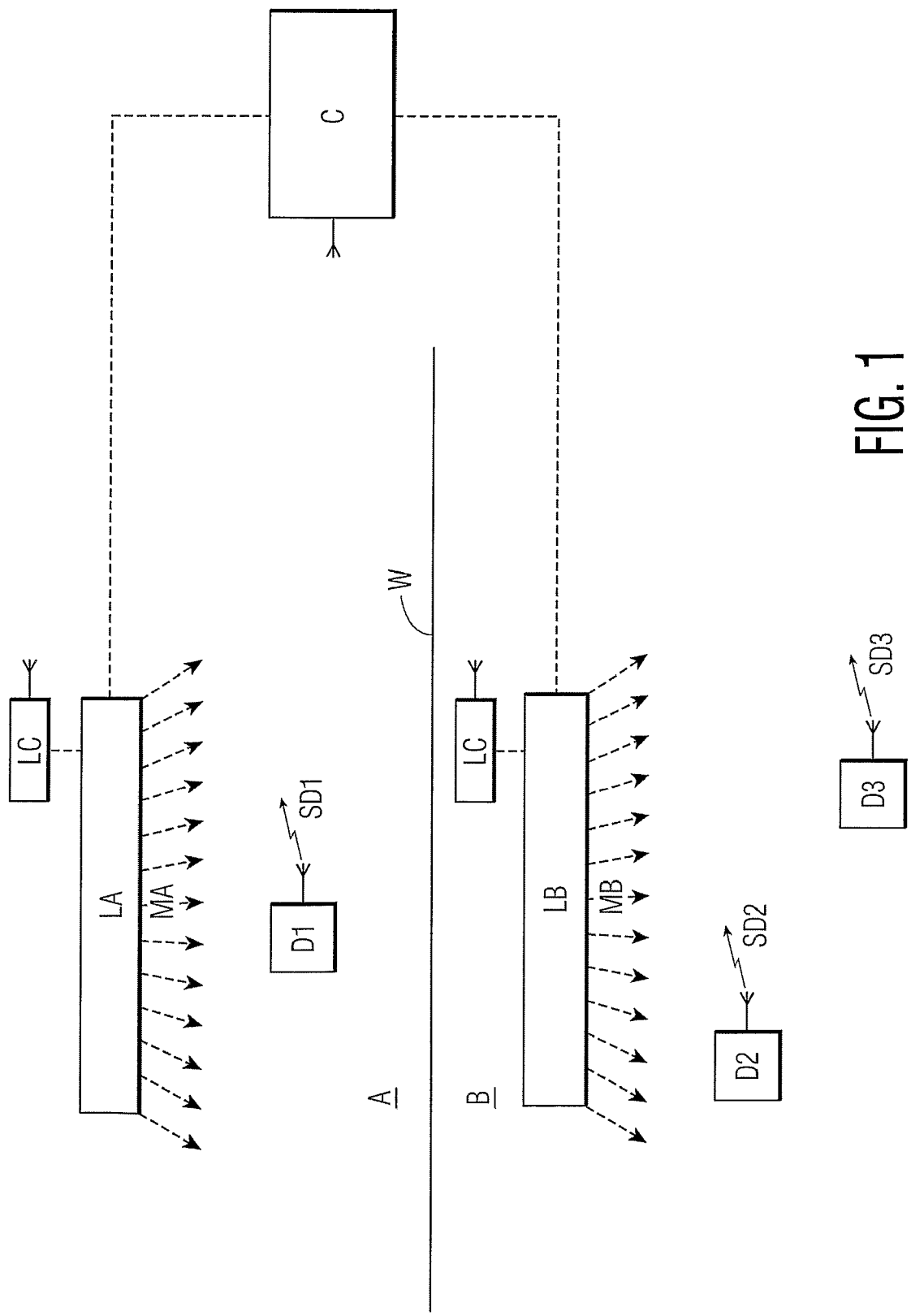
FIG. 1 is a schematic illustration of occupancy detection in an exemplary embodiment of invention.

The exemplary embodiment of FIG. 1 illustrates a simple lighting system utilizing the invention. This system includes two local areas A and B, each having a respective light source. The invention is also applicable to a single local area and to lighting systems including many local areas, but the two-area embodiment of FIG. 1 is sufficient to explain the invention in principle.

The local areas A,B include the respective light sources LA, LB for illuminating these areas with sufficient coverage to impinge on any wearable occupancy detectors present. Each of these light sources may include one or more light units (e.g. fluorescent, HID, LED), positioned as necessary to accomplish this purpose. The light emitted by the light units is modulated to identify the specific local area in which it is located. This can be done, for example, by frequency modulating the light in accordance with a code that uniquely identifies the respective local area. The modulation can be continuous or intermittent and is preferably in a frequency range that is not noticeable by the human eye.

The modulation of the light from the light source in one local area should not be detectable by any occupancy detector located in a different local area. In the embodiment of FIG. 1, this is achieved by a wall W, which blocks modulated light MA emitted by light source LA from reaching any occupancy detectors in local area B. Similarly, wall W blocks modulated light MB emitted by light source LB from reaching any occupancy detectors in local area A. Exemplary alternatives to the wall W include directing the modulated light in one local area so that it does not impinge on occupancy detectors in another local area or separating the local areas sufficiently so that modulated light from one local area is too attenuated to be detected when it reaches another local area.

At the instant in time depicted in FIG. 1, wearable occupancy detector D1 is located in local area A and wearable occupancy detectors D2 and D3 are located in local area B. Advantageously, these occupancy detectors are in the form of tags or badges that can be conveniently worn by persons who will occupy the local areas. Preferably, the detectors utilize low-power integrated circuitry to minimize power drain from a power source such as a battery and/or solar-cell array.

Figure 2:
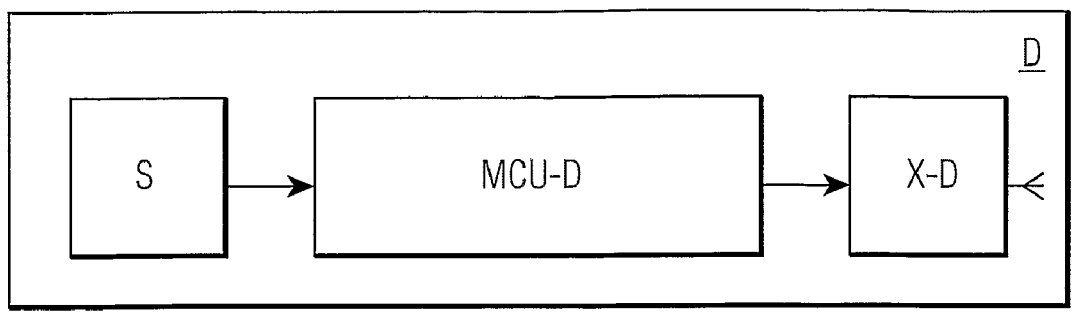
FIG. 2 is a block diagram of an exemplary embodiment of an occupancy detector.

FIG. 2 illustrates an embodiment of one such occupancy detector D, which includes a light sensor S, a micro-controller unit MCU-D, and an RF transceiver X-D. The light sensor S detects the modulated light in the local area where the detector is situated, extracts the respective local area identifier (e.g. area A), and converts the identifier to a digital signal that is applied to the micro-controller unit MCU-D. This micro-controller unit:

converts the detected local-area identifier to a location code recognizable by a lighting system controller C;

produces a detector-locator signal representing this location code and, optionally, an ID code identifying the respective occupancy detector in which it is incorporated (e.g. D1); and applies this signal to the RF transceiver X-D.

The transceiver X-D transmits an RF signal modulated by the detector-locator signal to effect communication of the encoded information to the lighting system controller C either directly or via a lighting control unit LC.

Figure 3:
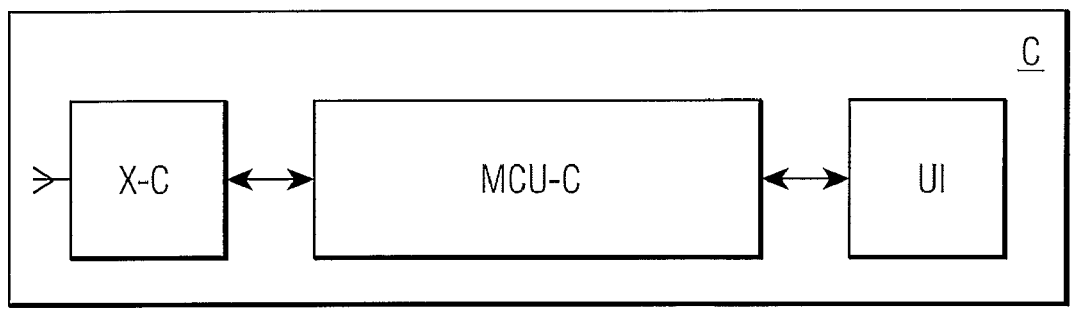
FIG. 3 is a block diagram of an exemplary embodiment of a lighting system controller.

If coupled directly, the lighting system controller C is located where it can receive the detector-locator signals from the wearable-occupancy detectors D whenever they are in any of the local areas which it is to control. The controller C can be located outside of all local areas, in a local area, and even in one of the light sources itself. As shown by the broken lines in FIG. 1, the lighting system controller C and the lighting control units LC are also coupled to each of the light sources. This may be done via any convenient mode, e.g. via wired coupling or wireless couplings such as RF, IR or visible light. FIG. 3 illustrates an exemplary embodiment of a lighting system controller C. In this embodiment, the system controller C includes a transceiver X-C for receiving and transmitting RF communications, a user interface UI for communicating with a person controlling the operation of the lighting system, and a micro-controller unit MCU-C for processing all of these communications.

Figure 4:
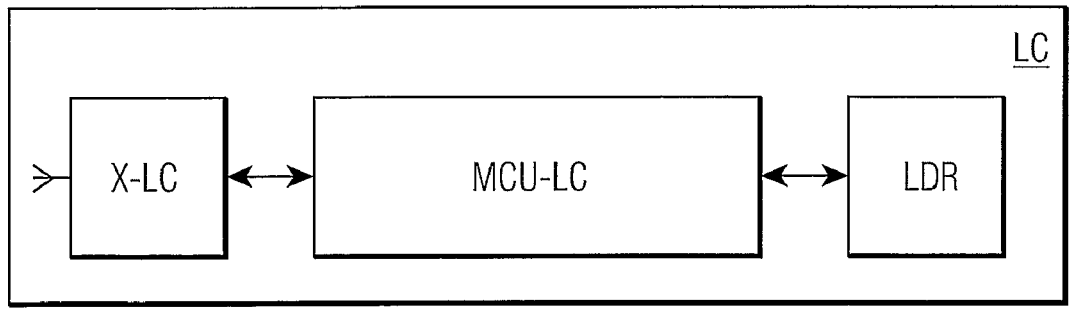
FIG. 4 is a block diagram of an exemplary embodiment of a lighting control unit.

In one embodiment of the invention, the system controller C receives the detector-locator signals directly from the wearable-occupancy detectors. In another embodiment (described in detail in this application), these signals are relayed to the lighting system controller, e.g. via one or more of the lighting control units LC. Advantageously, these units LC may be incorporated in one or more of the light sources. FIG. 4 illustrates an embodiment of a lighting control unit LC. In this embodiment, the lighting control unit LC includes a transceiver X-LC for receiving and transmitting RF communications, light driver circuitry LDR for the type of light sources being used, and a micro-controller unit MCU-LC. This micro-controller unit converts signals that it provides to and receives from the transceiver X-LC in accordance with protocols used in the lighting system. For example, commands and other information (such as detector and local area identifiers) might be conformed to the DALI standard and embedded in an RF communication protocol such as ZIGBEE. The micro-controller unit MCU-LC also controls the light driver circuitry LDR to:

modulate the illumination light produced by the respective light source to identify the local area in which it is situated;

perform basic functions, e.g. turning the light source on or off, dimming the light output, etc., in accordance with commands received from the lighting system controller C.

Lighting Control Unit Operation

Figure 5:
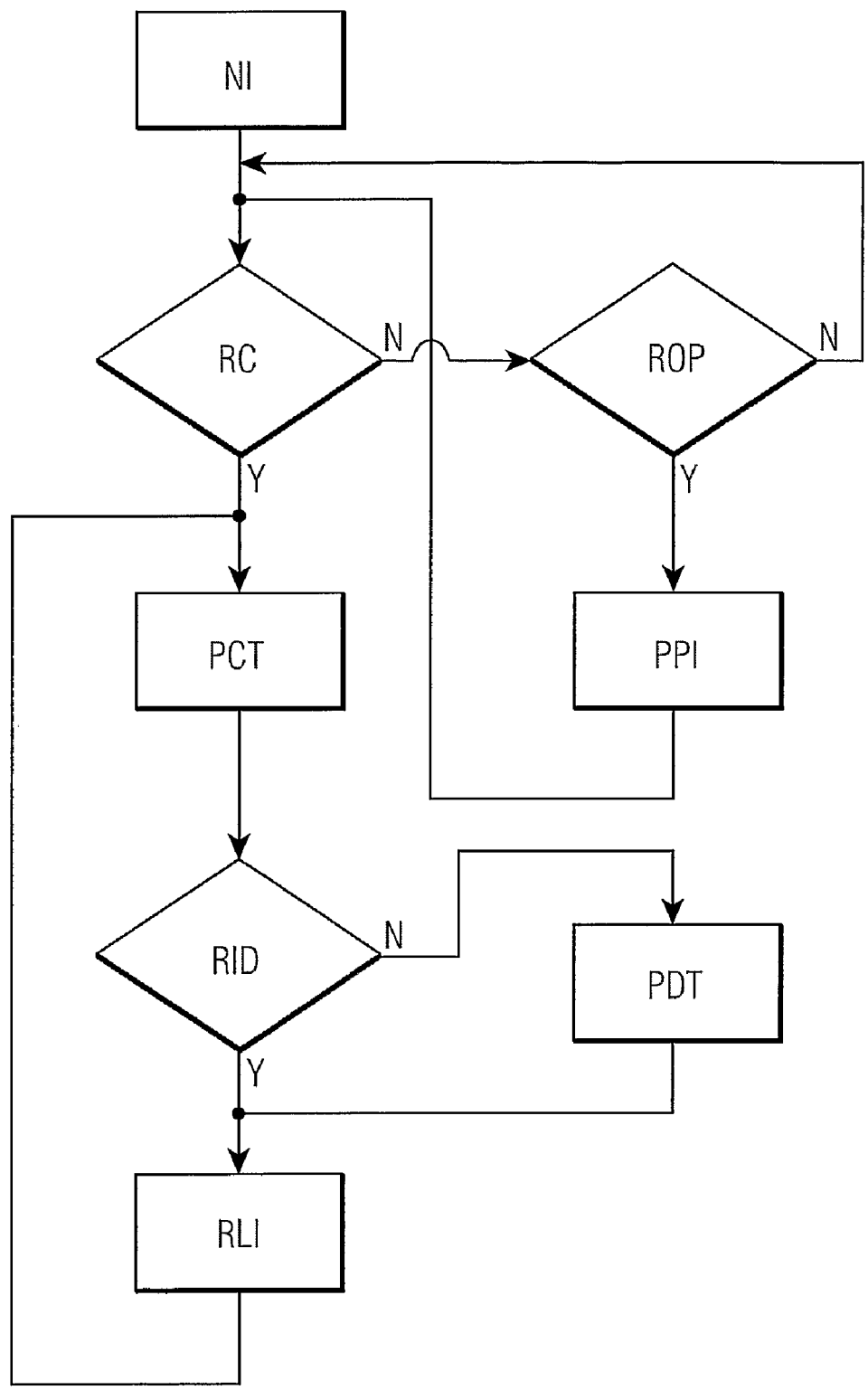
FIG. 5 is a flow chart illustrating exemplary operation of the lighting control unit of FIG. 4.

FIG. 5 illustrates exemplary operation of the micro-controller unit MCU-LC in the lighting control unit LC shown in FIG. 4. Specifically:

At NI the lighting control unit LC is initialized via transmissions through its transceiver X-LC. Initialization is a procedure whereby the lighting system controller C assigns respective network ID codes to all components that join the network. Note that there can be more than one lighting control unit for a local area. For example, a light source for a local area may include a number of light units, each having a lighting control unit LC. In this case one of these lighting control units in the respective local area may be advantageously operated as a master and the others as slaves. A detailed description of one way in which initialization in such a master-slave arrangement may be done is given in U.S. patent application Ser. No. 10/323,414 filed on 19 Dec. 2002, which is hereby incorporated by reference.

At RC the lighting control unit LC determines whether it is receiving any signals or commands indicating that the local area should be lighted for a person. Such a determination can be made in a variety of ways, depending on the way that the lighting system is set up. For example: (i) The detectors D can each continually emit an RF signal detectable by the transceiver X-LC in a lighting control unit when the person with the detector enters the respective area, thereby causing the light source in the area to transmit the modulated light with the respective local-area identifier. (ii) When a person with a detector leaves a first local area (and the detector no longer transmits the locator signal for that area) the lighting system controller C could command one or more lighting control units in adjacent local areas to illuminate those areas. (iii) IR sensors along pathways to or in local areas could sense the entry of a person into a local area and send the respective lighting control unit a signal indicating that a person is entering the area.

If it is not receiving a signal or command to light the local area, at ROP the micro-controller unit MCU-LC determines whether any other commands (e.g. dimming commands) or signals (e.g., in an automated environment-control system, sensed temperature or ambient light level for the respective local area) are being received from the transceiver.

If no, the micro-controller unit returns to RC.

If yes, the micro-controller unit processes the commands or signals at PPI and returns to RC.

If it is receiving a signal or command to light the local area, at PCT micro-controller unit MCU-LC causes the light driver circuitry LDR to illuminate the respective local area with light that is modulated to identify the local area (e.g. local area B) and goes to RID.

At RID the lighting control unit continuously or intermittently modulates the light in the local area and determines whether a correct response from any occupancy detector(s) D located in the respective local area is received. A correct response will be a detector-locator signal that includes a code for the respective local area. For example, if the lighting control unit is controlling the illumination of local area B, a correct response for a detector in this area will include a code identifying local area B.

If a correct response is received the lighting control unit will go to RLI and transmit the location code via the transceiver X-LC to the lighting system controller C, indicating that a person is in the respective local area, and return to RC. If the detector-locator signal from the occupancy detector also includes an ID code identifying the individual detector, this information will also be transmitted to the lighting system controller.

If a correct response is not received, the micro-controller unit MCU-LC in the respective lighting control unit will:

go to PDT and perform a default task, e.g. cause the light driver circuitry LDR for the respective light source to dim or extinguish the local area lighting;

go to RLI and inform the lighting system controller C that no occupant is in the respective local area; and return to RC.

Lighting System Controller Operation

Figure 6:
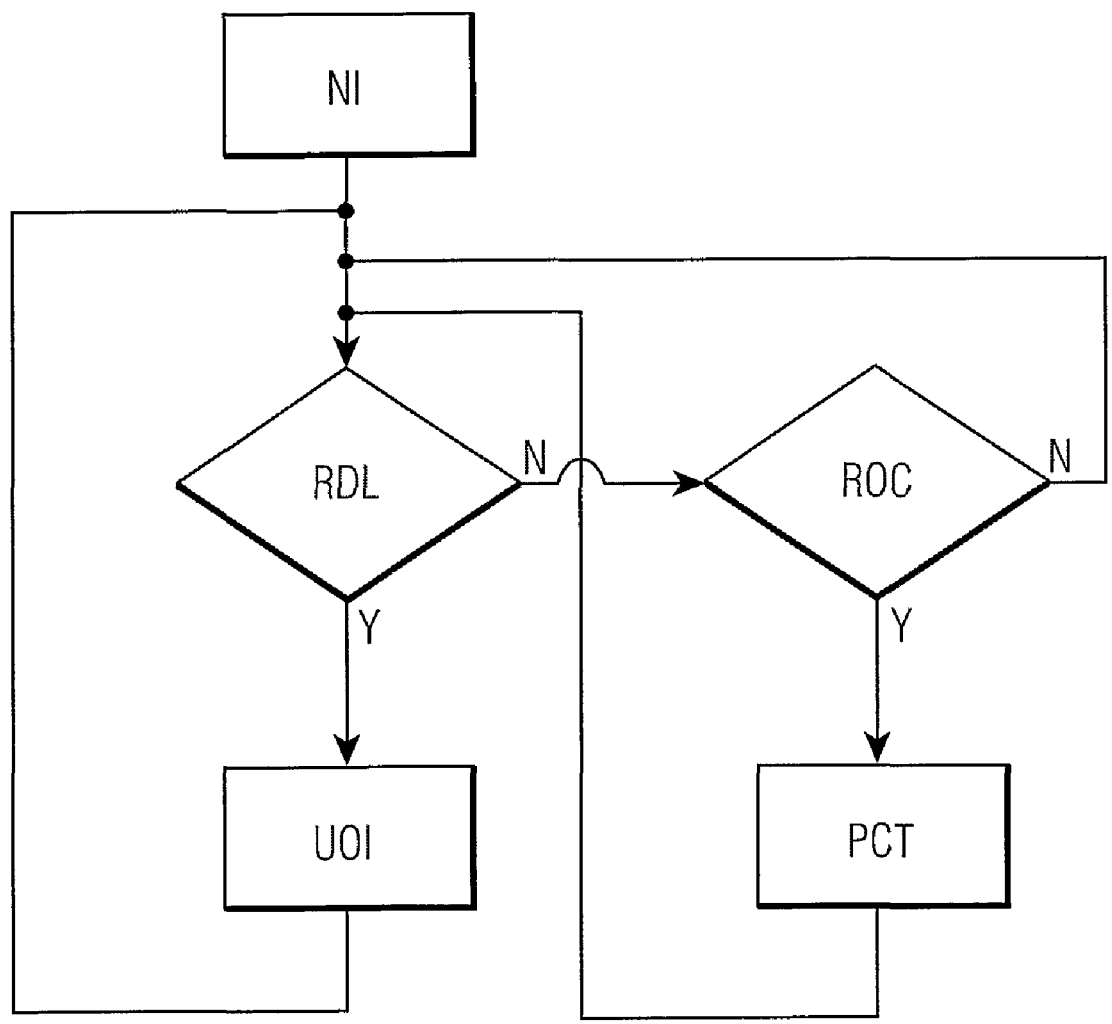
FIG. 6 is a flow chart illustrating exemplary operation of the lighting system controller of FIG. 3.

FIG. 6 illustrates exemplary operation of the micro-controller unit MCU-C in the lighting system controller C shown in FIG. 3. Specifically:

At NI the lighting system controller initializes into a communication network the occupancy detectors D, the lighting control unit LC, and possibly other components that are capable of communicating with the controller. In the exemplary lighting system of FIG. 1, this would include the wearable occupancy detectors D1, D2, D3 and lighting control units LC-A and LC-B (not shown) associated with the light sources LA and LB, respectively. All of these components would be initialized via RF communications passing through respective transceivers of the components.

At RDL the lighting system controller C determines whether its transceiver X-C is receiving any detector-location codes and detector ID codes from the lighting control units in the system.

If yes, at UOI micro-controller unit MCU-C updates a look-up table in the unit to indicate that a wearable occupancy detector D has been detected in the identified local area and, if included, the identity of the detector. It then returns to RDL. The look-up table may also include other information relevant to the detector, such as the identity of the person who was issued the detector.

If no, at ROC the micro-controller unit MCU-C checks whether any commands or requests have been received via the user interface UI or the transceiver X-C.

If no, the micro-controller unit returns to RDL.

If yes, the micro-controller unit performs the required action and returns to RDL. Examples of such actions include issuing a command to dim the lighting in a specific local area in response to a command from the user interface and initializing a system component in response to a request.

As another example of an action to be taken at UOI, if the look-up table specifies that local area A should be lighted whenever an occupant is present and the received detector-location code indicates that a wearable occupancy detector is present in local area A, the micro-controller unit MCU-C would issue a command to the lighting control unit for light source LA (transmitted by transceiver X-C) to light local area A. The look-up table could be permanent or it could be readily updated, e.g. via the user interface UI.

As another example, one or more look-up tables could specify the security clearances of different persons who have been issued wearable occupancy detectors and the security clearances required for access to different local areas. An action to be taken by micro-controller unit MCU-C at UOI could then be to verify whether a person issued the detector located in a specific local area has the required clearance for the area. Alternatively, this could be done at ROC and PCT in response to a command from the user interface UI.

Occupancy Detector Operation

Figure 7:
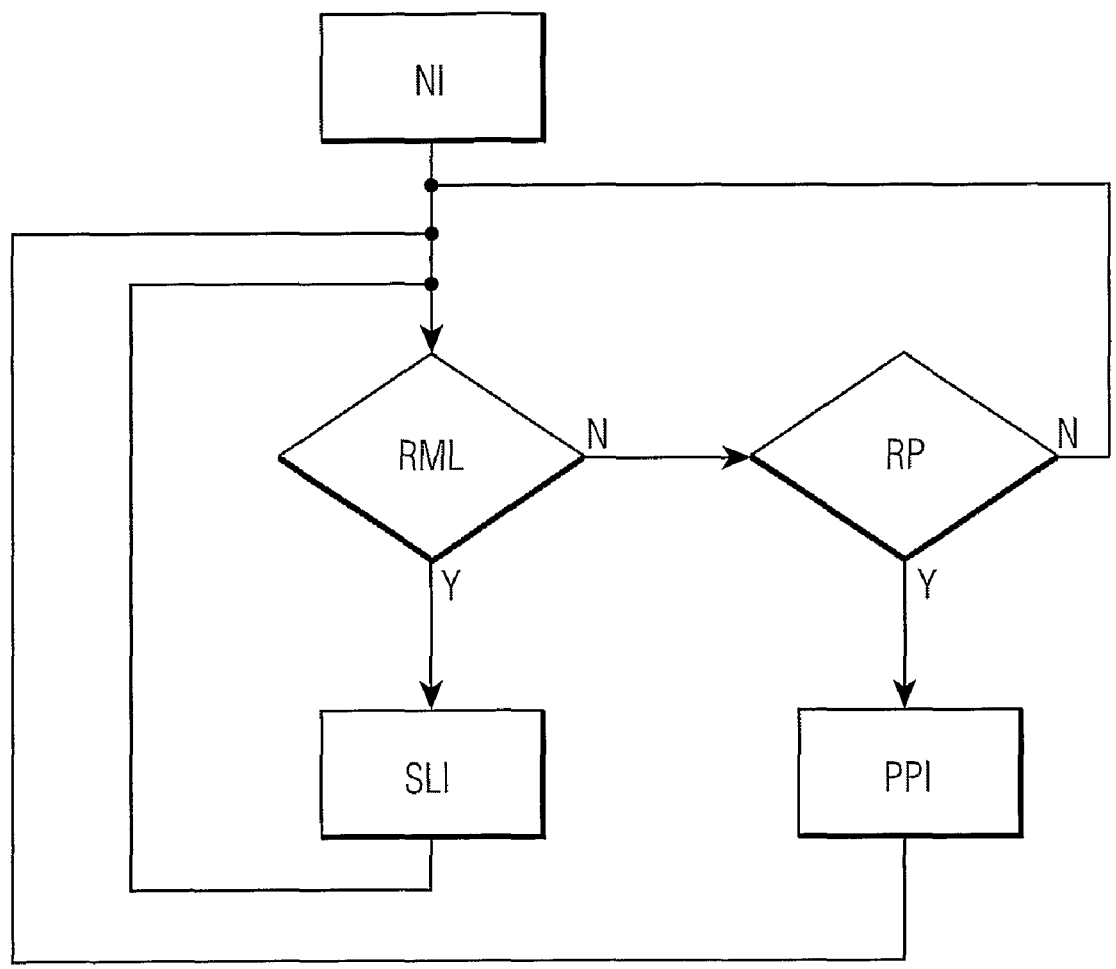
FIG. 7 is a flow chart illustrating exemplary operation of the occupancy detector of FIG. 2.

FIG. 7 illustrates exemplary operation of the wearable occupancy detector D shown in FIG. 2. Specifically:

At NI each occupancy detector D is initialized whenever it enters within RF range of a lighting control unit LC.

At RML the micro-controller unit MCU-D in the occupancy detector determines whether it is receiving modulated light in a local area.

If yes, at SLI it transmits the detector-locator signal identifying the local area in which it is located, and optionally a unique detector ID code. This information is relayed to the lighting system controller C by the respective lighting control unit LC. The micro-controller unit MCU-D then returns to RML.

If no, at RP it determines whether any commands or requests are being received via the transceiver X-D (e.g. a command from the lighting system controller C for all detectors within transmission range of lighting control units LC to identify themselves).

If no, the micro-controller unit returns to RML.

If yes, the micro-controller unit processes the command or request at PPI and returns to RML.

While exemplary embodiments of the invention are described, various modifications and changes can be made without departing from the spirit and scope of the invention.

It is therefore to be understood that the invention includes all embodiments that fall within the scope of the appended claims.

Alternatives

Although D/C/LC shown as communicating via RF, could also be wired and/or other type of wireless than RF.

What is claimed is:

1. A lighting control system comprising:
a light source for emitting a light to illuminate a local area, the light being modulated based on a code that uniquely identifies the local area;
a wearable occupancy detector for detecting the modulated light and, in response to the modulated light, radiating a signal identifying the local area; and
a control unit in communication with the light source, the control unit controlling a lighting function of the light source in response to reception of the radiated signal.

2. A lighting control system according to claim 1 wherein the radiated signal travels beyond the local area.

3. A lighting control system according to claim 1 wherein the control unit directly receives the radiated signal.

4. A lighting control system according to claim 1 wherein the signal radiated by the wearable occupancy detector identifies the detector.

5. A lighting control system according to claim 1 wherein the signal radiated by the wearable occupancy detector identifies a particular person.

6. A lighting control system comprising:
a first light source for emitting a first light to illuminate a first local area, the light being modulated based on a code that uniquely identifies the first local area;
a second light source for emitting a second light to illuminate a second local area, the second light being modulated based on a code that uniquely identifies the second local area;
a wearable occupancy detector for detecting the modulated first or second light and radiating a signal in response to either the modulated first or second light, the signal identifying the first or second local area; and
at least one control unit in communication with the first and second light sources, the at least one control unit controlling a lighting function of the first and second light sources in response to reception of the radiated signal.

7. A lighting control system according to claim 6 wherein the at least one control unit comprises first and second control units, each in communication with a respective one of the first and second light sources.

8. A lighting control system according to claim 6 wherein the radiated signal is capable of traveling travels beyond at least one of the first and second local areas.

9. A lighting control system according to claim 6 wherein the at least one control unit directly receives the radiated signal.

10. A lighting control system according to claim 6 wherein the signal radiated by the wearable occupancy detector identifies the detector.

11. A lighting control system according to claim 6 wherein the signal radiated by the wearable occupancy detector identifies a particular person.

12. A lighting control system comprising:
a plurality of light sources for emitting light to illuminate a plurality of respective local areas, the light from each of the plurality of light sources being modulated in accordance with at least one code of a plurality of codes, wherein each of the plurality of codes uniquely identifies one of the respective local areas;
a wearable occupancy detector for detecting the modulated light and radiating a signal in response to the modulated light, the radiated signal identifying at least one of the respective local areas;
at least one control unit in communication with the plurality of light sources and controlling a lighting function of the plurality of light sources; and
a lighting system controller in communication with the at least one control unit for controlling operation of the control unit in response to reception of the radiated signal.

13. A lighting control system according to claim 12 wherein the lighting system controller directly receives said radiated signal.

14. A lighting control system according to claim 12 wherein the lighting system controller indirectly receives said radiated signal via a communication from the at least one control unit.

15. A lighting control system according to claim 12 wherein the at least one control unit comprises first and second control units, each in communication with a respective one of the light sources.

16. A lighting control system according to claim 12 wherein the at least one control unit directly receives the radiated signal.

17. A lighting control system according to claim 12 wherein the signal radiated by the wearable occupancy detector identifies the detector.

18. A lighting control system according to claim 12 where wherein the signal radiated by the wearable occupancy detector identifies a particular person.

* * * * *